United States Patent [19]

Mead

[11] Patent Number: 5,173,780
[45] Date of Patent: Dec. 22, 1992

[54] METHOD AND APPARATUS FOR CORRECTING DRIFT IN THE LEVEL OF A VIDEO SIGNAL IN A TELECINE

[75] Inventor: Terence W. Mead, Hertforshire, United Kingdom

[73] Assignee: Rank Cintel Limited, England

[21] Appl. No.: 815,410

[22] Filed: Dec. 31, 1991

Related U.S. Application Data

[63] Continuation-in-part of Ser. No. 571,627, Sep. 4, 1990, abandoned.

[30] Foreign Application Priority Data

Mar. 4, 1988 [GB] United Kingdom ............... 8805219

[51] Int. Cl.⁵ .................... H04N 3/36; H04N 5/253
[52] U.S. Cl. .................. 358/214; 358/216; 358/54
[58] Field of Search ........... 358/214, 215, 217, 216, 358/237, 97, 168, 332, 244.2, 348, 54; 369/125, 101, 121

[56] References Cited

U.S. PATENT DOCUMENTS

| | | | |
|---|---|---|---|
| 4,345,271 | 8/1982 | Sekieuchi | 358/10 |
| 4,703,360 | 10/1987 | Shor | 358/214 |
| 4,823,204 | 4/1989 | Holland | 358/214 |
| 4,897,729 | 1/1990 | Mumford | 358/216 |
| 4,914,520 | 4/1990 | Beard | 358/214 |

OTHER PUBLICATIONS

K. M. Trampel and H. H. Jensen, Calibration of Photographic Scanning System, Jan./1963, vol. 5 No. 8, pp. 110-111, IBM Technical Disclosure Bulletin.

Dominic J. Case, Telecine-Compatible Prints, Jun. 1989, SMPTE Journal pp. 451-454.

Henry A. Barrett, Improved Telecine Image Quality: The Influence of Black Level, Oct. 1973, SMPTE Journal pp. 829-840.

Primary Examiner—James J. Groody
Assistant Examiner—Sherrie Hsia
Attorney, Agent, or Firm—Ostrolenk, Faber, Gerb & Soffen

[57] ABSTRACT

In a flying spot telecine including cathode ray tube scanning circuit for generating flying spot and a photodetector for receiving light transmitted by a film strip being scanned by the telecine, a control circuit is provided for causing the CRT scanning circuit to scan an area (18) corresponding to the position of one or more perforations (16) in the film strip (10) being scanned. The output from the photodetector during a scan of the area (18) provides a correction signal for adjusting the video signal level. Preferably, the scan of the area (18) is performed during line blanking or frame blanking periods.

16 Claims, 1 Drawing Sheet

METHOD AND APPARATUS FOR CORRECTING DRIFT IN THE LEVEL OF A VIDEO SIGNAL IN A TELECINE

RELATED APPLICATIONS

The present application is a continuation-in-part application of Ser. No. 571,627 filed Sep. 4, 1990.

BACKGROUND OF THE INVENTION

The present invention relates to a method and apparatus for the correction of drift in the level of a video signal provided by a flying spot telecine, in particular, drift arising from instability or progressive drift in the preliminary stages of telecine equipment.

Such errors may be caused, for example, by variations in the intensity of the output of the cathode ray tube ("CRT") scanning means used in flying spot telecine equipment or by variations in photomultiplier tube sensitivity or amplifier gain. These variations are usually of a relatively long term nature. That is to say they cause the video signal level or the colour balance to drift over a period of minutes or longer.

Attempts have been made to reduce signal drift due to variations in the sensitivity of photomultiplier tubes by placing heating elements adjacent the photomultiplier tubes to maintain them at a constant temperature. While this does reduce signal drift to an extent, the elevated temperatures which result increase the noise contributions to the output signal from the photomultiplier tubes and adjacent amplifiers. Furthermore, the use of heating elements has no effect on drift which results from factors other than temperature.

BRIEF DESCRIPTION OF THE INVENTION

The method and apparatus of the invention are characterised in that cathode ray tube ("CRT") scanning means used to generate the flying spot is caused to scan an area corresponding to the position of one or more perforations in a film strip being scanned by the telecine; the output from a photodetector receiving light transmitted during a scan of the area providing a correction signal for adjusting the video signal level.

Thus, by collecting light which passes through the film perforations, equivalent to a 'no-film' condition, a direct measure can be obtained of the composite effect of all the errors outlined above. The video signal level can then be corrected by adjusting the gain of the amplifier or of the photomultiplier tube or by altering the brightness of the CRT scanning means.

Preferably, scanning of the film perforations to correct video signal drift is performed during line or frame blanking periods.

BRIEF DESCRIPTION OF THE DRAWING(S)

An embodiment of the invention will now be described, by way of example, with reference to the drawings, in which.

DETAILED DESCRIPTION OF THE INVENTION

Figure 1:
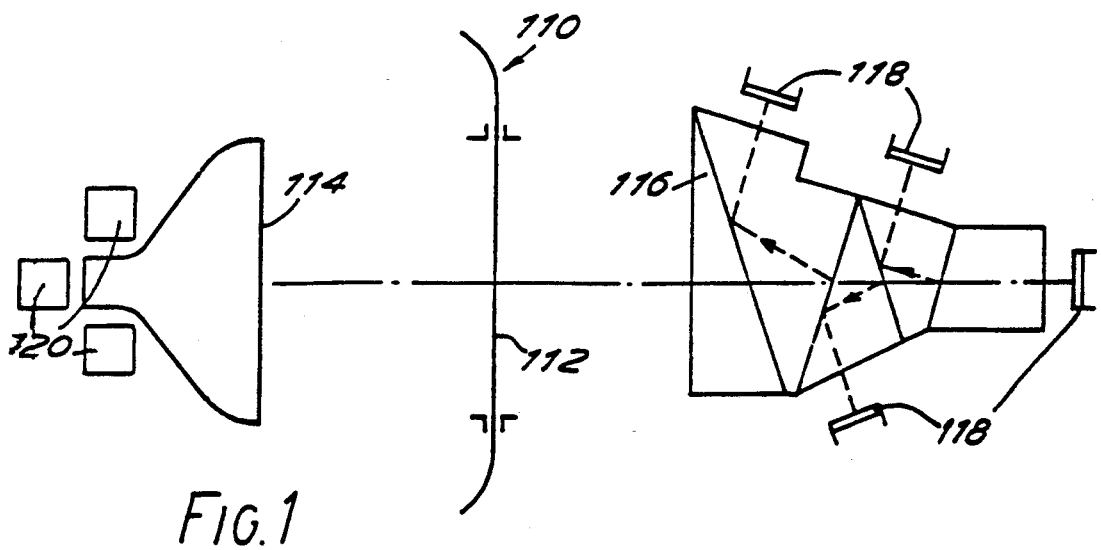
FIG. 1 is a schematic diagram of a flying spot telecine.
Figure 2:
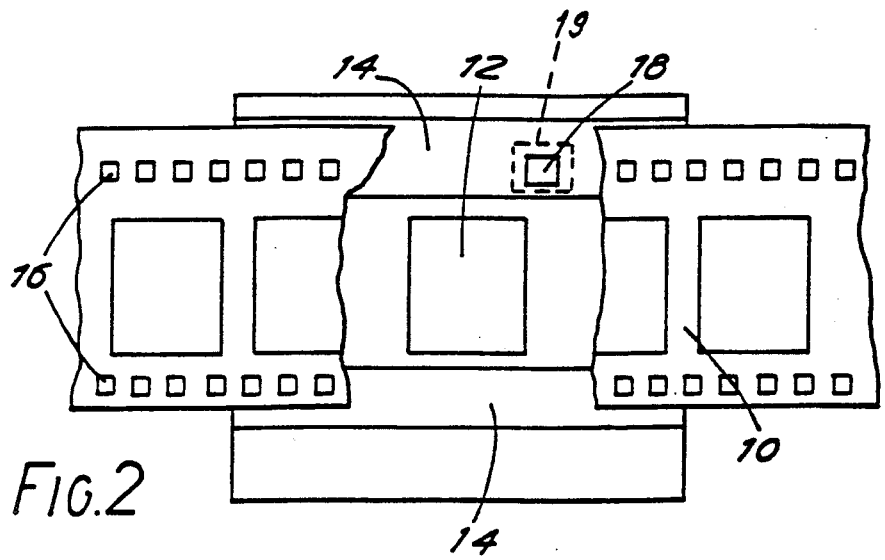
FIG. 2 is a fragmentary schematic view of the film skid plate region of flying spot telecine equipment.
Figure 3:
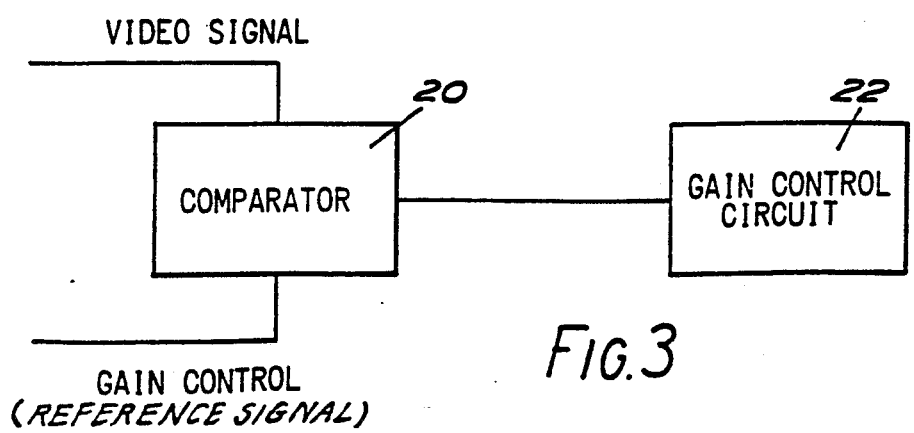
FIG. 3 is a block diagram of control circuitry in accordance with the invention.

In conventional flying spot telecine equipment, a typical example of which is shown schematically in FIG. 1, the film 110 to be scanned passes through a film gate 112 where it is scanned by a flying spot generated by CRT scanning means 114. Light transmitted through the film in its transparent and translucent areas is collected by one or more photomultiplier tubes 118 after being split t a beam splitter 116 into three or more colour components and otherwise processed. The output signals from the photomultiplier tubes 118 form the basis for the video signal. At the film gate 112 the area of the film strip 10 actually scanned by the flying spot is defined by a viewing aperture 12 formed in a skid plate 14 over which the film strip 10 passes, as shown in FIG. 2.

The film strip 10 is transported through the telecine film gate 112 by means of a capstan or other drive means. Picture synchronization is achieved by pulses from a suitable sprocket which engages in rows or perforations 16 formed along the longitudinal edges of the film strip 10. In the telecine equipment of the invention a second aperture 18, the perforation aperture, is formed in the skid plate 14 and the CRT scanning means 114 is caused to perform an auxiliary scan of the film strip perforations 16 through the perforation aperture 18 during the frame blanking period. This is achieved by providing scanning amplifiers 120 which drive the CRT scanning means 114 with a suitable waveform which produces a small auxiliary scan at a location equivalent to a film perforation 16. The waveform includes a component to track the motion of the continuously moving film strip 10.

Light from the auxiliary scan passes through the film perforation 16 and the perforation aperture 18 of the skid plate 14 to be collected by the photomultiplier tubes 118 in the usual way. The auxiliary scan thus gives rise to a video signal which corresponds to a 'no film' condition, that is, a signal the level of which is dependent only on the conditions of the telecine equipment itself and not upon variations in the film.

The video signal resulting from the auxiliary scan is then compared by means of a comparator circuit 20, to an adjustable gain control voltage (a reference signal typically generated by a potentiometer, joystick or tracker ball) whose magnitude does not vary as a function of the operating parameters of the telecine and the result of the comparison is applied to a control circuit 22. The control circuit 22 increments or decrements the photomultiplier control output which controls the voltage applied to the photomultiplier tubes and, hence, their gains. When the photomultiplier tube gain is just sufficient to compensate for the error, the comparator circuit 20 will reach its threshold and the photomultiplier control output be maintained constant until a further error occurs.

The rate of incrementing or decrementing the photomultiplier control output must be slow enough to avoid the possibility of translating video noise into frame-by-frame flicker which would be visible to the viewer. However, in telecines using programmable colour correction techniques it may be necessary to change the system gain very quickly. This can be achieved by temporarily increasing the speed of the gain control circuitry whenever a change to the gain control voltage is required.

Where dense film or negative film is used, one or more colour signals may need a greater system gain than is usual; during the scan of the perforations 16 the whole of the light beam produced by the CRT scanning means is transmitted to the photomultiplier tube. With the greater system gain, there is a risk that overloading of the video signal during the scan of the perforations may occur which would prevent correct operation.

To overcome this difficulty, an attenuating filter 19 (shown in phantom) may be placed over the perforation aperture 18 in the skid plates 14. This results in an overall reduction in the video signal level, leading to a lower auxiliary scan signal level during normal operation but avoiding overload problems when a higher gain is required. Alternatively, the output of the CRT scanning means may be reduced by turning the beam current down during the auxiliary scan of the film perforations 16.

The above method can be applied using either digital or analogue techniques as appropriate to the particular telecine equipment being used. It will be appreciated that, although the method described above applied a correction signal to the photomultiplier gain, it might equally well be applied to the CRT scanning means to control the brightness or to the amplifier to adjust the gain.

Preferably, the method is applied to each colour independently so as to maintain the correct colour balance as well as the overall video signal level.

What is claimed is:

1. A method for correcting drift in the level of a video output signal provided by a flying spot telecine, said method comprising the steps of:
   scanning a film strip with flying spot so that light passes through the film strip and is received by a photodetector circuit which generates an output video signal as a function of the light received thereby;
   causing the flying spot to intermittently scan a perforation area corresponding to the position of one or more perforations in the film strip being scanned so that the output video signal from the photodetector circuit during the scan of the perforation area varies as a function of variations in operating parameters of the telecine; and
   adjusting the level of the output video signal generated by the photodetector circuit as a function of (1) the level of the output video signal during the time that the scan of the perforation area takes place and (2) a reference signal which does not vary as a function of variations in the operating parameters of the telecine so as to compensate for the drift level.

2. A method according to claim 1, wherein the step of adjusting the level of the output video signal includes the steps of comparing the output video signal generated by the photodetector circuit during the time that a scan of the perforation area takes place with said reference signal to provide a difference signal representing the difference therebetween, and using the difference signal to adjust the level of the output video signal.

3. A method according to claim 1, which the perforation area is scanned during a blanking period of the telecine.

4. A method according to claim 1, wherein said step of adjusting the level of the output video signal is carried out by adjusting the brightness of the flying spot.

5. A method according to claim 1, wherein an amplifier is used to amplify the output of the photodetector circuit and wherein the step of adjusting the level of the output of the video signal is carried out by adjusting the gain of the amplifier.

6. The method according to claim 1, in which the step of adjusting the level of the output video signal is carried out by adjusting the gain of the photodetector circuit.

7. A method according to claim 1, further including the step of passing the flying spot through both an attenuating filter and the perforation area during the step of scanning the perforation area with the flying spot.

8. A method for correcting drift in the level of a video output signal provided by a flying spot telecine, said method comprising steps of:
   scanning a film strip with a flying spot so that light passes through the film strip;
   splitting the light passing through the film strip into a plurality of beams containing different respective wavelengths range, each of the beams being received by a respective photodetector circuit, the output of each of the photodetector circuits forming respective output video signals;
   causing the flying spot to intermittently scan a perforation area corresponding to the position of one or more perforations in the film strip being scanning so that the output video signals of the respective photodetector circuits during the scan of the perforation varies as a function of variations in the operating parameters of the telecine;
   adjusting the level of each output video signal as a function of (1) its own level during the time that the scan of the perforation area takes place and (2) the level of a reference signal which does not vary as a function of variations in the operating parameters of the telecine.

9. A flying spot telecine comprising:
   scanning means for generating a flying spot for scanning a film strip to be scanned by the telecine;
   a photodetector circuit for receiving light transmitted through the film strip being scanned by the telecine and generating an output video signal as a function of the light received thereby;
   control means for causing the scanning means to scan a perforation area corresponding to the position of one or more perforations in the film strip being scanned such that the output video signal from the photodetector circuit during a scan of the perforation area is indicative of a drift level resulting from variations in the operating parameters of the telecine; and
   adjusting means for adjusting the level of the output video signal generated by the photodetector circuit as a function of (1) the level of the output video signal during the time that a scan of the perforation area takes place and (2) a reference signal which does not vary as a function of variation in the operating parameters of the telecine.

10. Apparatus according to claim 9, wherein said adjusting means includes a comparator for comparing the output video signal generated by said photodetector circuit during the time that a scan of the perforation area takes place with said reference signal to provide a difference signal representing the difference therebetween, the difference signal being used to adjust the level of the output video signal.

11. Apparatus according to claim 9, in which the scanning means is used to scan the perforation area corresponding to perforations in the film strip during a blanking period of the telecine.

12. Apparatus according to claim 9, in which the adjusting means adjusts the level of the output video signal by adjusting the brightness of the flying spot.

13. Apparatus according to claim 9, further including an amplifier used to amplify the output of the photodetector circuit, the adjusting means adjusting the level of the output video signal by adjusting the gain of the amplifier.

14. Apparatus according to claim 9, in which the adjusting means adjusts the level of the output video signal by adjusting the gain of the photodetector circuit.

15. A flying spot telecine, comprising:
scanning means for generating a flying spot for scanning a film strip to be scanned by a telecine;
means for splitting light transmitted through a film strip in a plurality of beams containing different respective wavelength ranges.

a plurality of photodetectors, equal in number to the number of beams, each arranged to receive a respective one of the beams, an output signal from each photodetector forming a respective output video signal;
a control means for causing the scanning means to scan a perforation area corresponding to the position of one or more perforations in the film strip being scanned so that the output video signals of the respective photodetectors during the scan of the perforation area is indicative of drift level resulting from variations in the operating parameters of the telecine; and
means for adjusting the level of each output video signal as a function of (1) its own level during the time that the scan of the perforation area takes place and (2) the level of a reference signal which does not vary as a function of variations in the operating parameters of the telecine.

16. Apparatus according to claim 9, in which an attenuating filter overlies the perforation area so that said flying spot passes through both said attenuating filter and the perforation area.

* * * * *